United States Patent Office 3,000,211
Patented Sept. 19, 1961

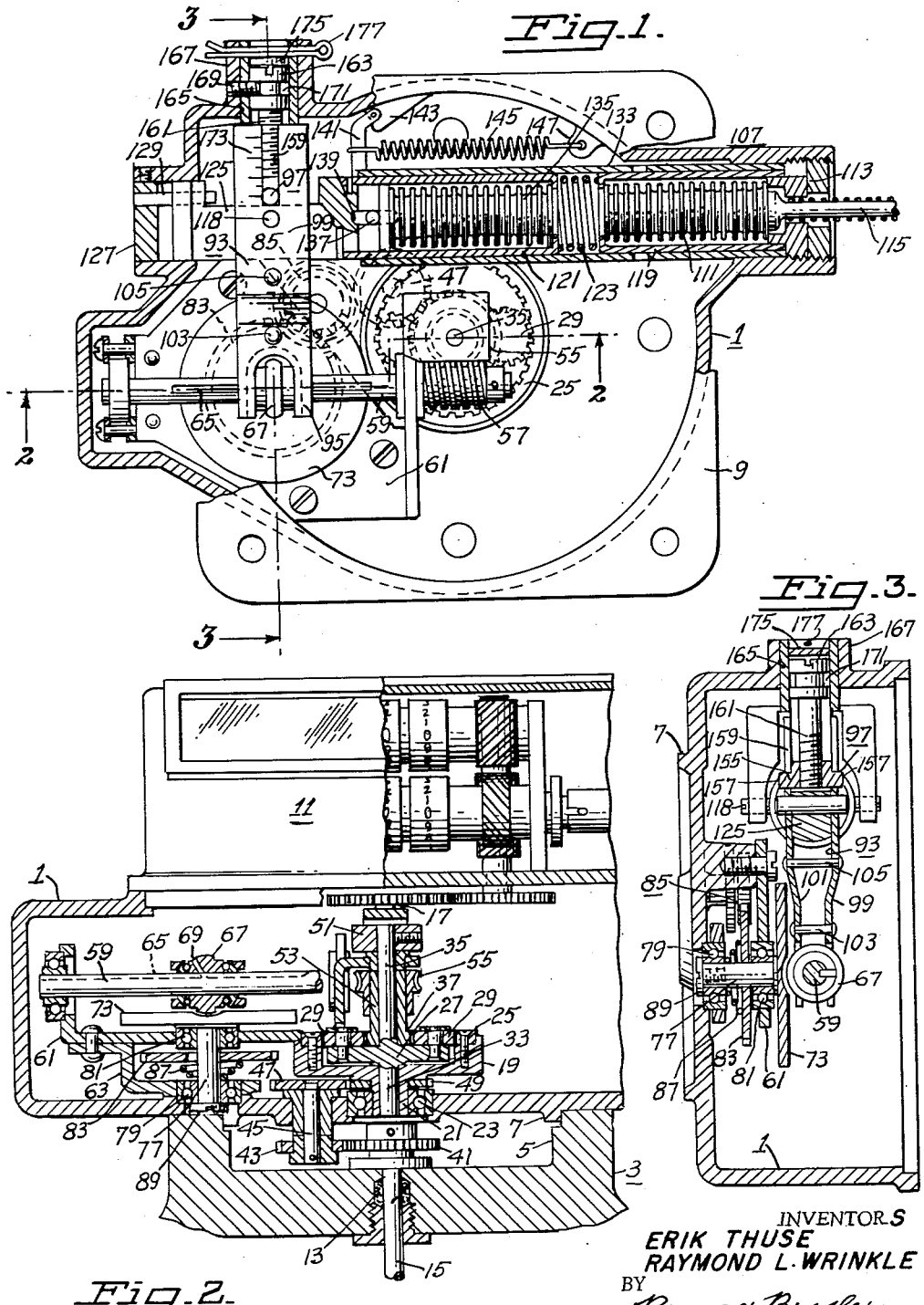

---

3,000,211
TEMPERATURE COMPENSATING COUPLING MEANS FOR LIQUID METERS
Erik Thuse and Raymond L. Wrinkle, Oakland, Calif., assignors to Granberg Corporation, Oakland, Calif.
Filed May 24, 1957, Ser. No. 661,447
3 Claims. (Cl. 73—233)

Our invention relates to temperature compensated liquid meters and more particularly to a temperature compensating coupling means for such meters.

In dispensing liquid such as gasoline, oil and the like, the volume thereof changes with variations in temperature of the liquid, the degree of change varying with the characteristics of the liquid, such as its specific gravity and coefficient of expansion. Unless otherwise provided for, a liquid meter, while measuring accurately in terms of volume, will not indicate true value in terms of weight or equivalent, at different temperatures. Thus ten gallons measured at 70 degrees Fahrenheit, when cooled down to some reference temperature, say 60 degrees Fahrenheit for example, will actually be somewhat less than ten gallons. On the other hand, ten gallons measured at a temperature under the reference temperature, will actually be more than ten gallons at the reference temperature.

To assure equal value regardless of temperature, it becomes necessary to compensate the meter with reference to a particular temperature, so as to always measure a liquid as if it were being dispensed at that temperature. It is common practice in the trade to establish such reference temperature at 60 degrees Fahrenheit.

Among the objects of our invention are:
(1) To provide novel and improved temperature compensating means for liquid meters;
(2) To provide novel and improved temperature compensating coupling means for liquid meters, which is capable of accurately altering the speed ratio between the rotating component of the meter and the recording and counting means, in strict accordance with the volumetric changes brought on by temperature changes in the liquid being measured;
(3) To provide novel and improved temperature compensating coupling means for liquid meters, which can be adjusted to handle liquids of different specific gravity and coefficient of expansion; and
(4) To provide novel and improved temperature compensating coupling means for liquid meters, which will respond to variation in temperature of liquid flowing through such meter, but will be unresponsive to changes in ambient atmospheric temperature.

Additional objects of our invention will be brought out in the following description of a preferred embodiment of the same, taken in conjunction with the accompanying drawings wherein, FIGURE 1 is a plan view, partly in section, of a temperature compensating coupling means for liquid meters embodying the present invention;

FIGURE 2 is a view in section taken in the plane 2—2 of FIGURE 1; and

FIGURE 3 is a fragmentary view in section taken in the plane 3—3 of FIGURE 1.

Referring to the drawings for the details of my invention in its preferred form, the temperature compensating coupling means is assembled in a housing 1 which is adapted to be mounted on the upper end of the casing 3 of a meter, preferably to a circular rib 5 formed on the casing of the meter to which the coupling housing 1 may be bolted. Its location with respect to the meter is determined by a circular guide rib 7 adapted to set snugly within the circular rib on the meter casing.

The housing 1 is preferably of cup shape, being provided with a flange 9 about the upper circular rim thereof, to support a counter 11 which is preferably bolted thereto.

In the upper end of the meter casing, centrally of the space defined by the supporting rib 5, is a packing gland 13 through which extends the shaft 15 of the meter, which shaft terminates within the space bounded by the supporting rib.

Depending from the counter and preferably in alignment with the meter shaft, is the counter shaft 17 which extends into and terminates within the housing of the temperature compensating coupling means. In the absence of desired temperature compensation, the counter shaft could be coupled directly to the meter shaft to record in any desirable units, such as gallons, the quantity of fluid flowing through the meter.

However, where temperature compensating is required, the temperature compensating coupling means is installed as part of the drive connection between the meter shaft and the counter shaft, to effect the necessary compensation by altering the speed ratio between the meter shaft and the counter shaft to the extent necessary to accomplish such compensation.

This temperature compensating coupling means includes a drive connection having one end connectible to the liquid meter shaft and the remaining end connected to the other shaft, such drive connection including a continuous speed ratio variable coupling, whereby the speed ratio may be adjusted in a gradual manner.

As to the details of this drive connection, it includes a dish-shaped element 19 having a hollow depending neck 21 for supporting the same in a thrust bearing 23 located in the floor of the housing, in alignment with the meter shaft, such dish-shaped element carrying about its rim, a ring gear 25.

Within the dish-shaped element is a disk 27 to which is rotatably anchored, a plurality of planet gears 29, in mesh with the ring gear 25, the disk having a depending stem 33 journalled in the neck of the disk-shaped element, and an upwardly extending stem 35. Surrounding this stem in mesh with the planetary gears, is a sun gear 37.

The planetary gear assembly involving the ring gear 25, the planet gears 29, and sun gear 37, is driven from the meter shaft by way of a gear train involving a gear 41 on the end of the meter shaft, in mesh with a gear 43 mounted on a stub shaft 45 journalled in a bushing in the floor of the housing, such stub shaft, at its other end, carrying a gear 47 in mesh with another gear 49 on the neck 21 of the dish-like element and affixed thereto.

To the end of the upwardly extending stem 35 there is mounted a clutch element 51 adapted to engage in a drive connection to the shaft of the counter.

The above-described drive connection between the meter shaft and the counter shaft is so designed as to preferably have a one to one ratio, with the sun gear remaining stationary.

However, to alter this speed ratio so as to compensate for temperature variations in the liquid flowing through the meter, adjustable means is provided for imparting rotational movement to the sun gear within a limited speed range and in either of opposite directions, whereby to either increase or decrease the speed ratio between the meter shaft and the counter shaft.

With this in mind, the sun gear is provided with an integral axially extending sleeve 53 surrounding the upwardly directed stem 35 and carrying at its upper end, as a part of the sun gear, a worm gear 55. Meshing with the worm gear is a worm 57 at the end of a bar 59 which is journalled within the upright walls of the frame 61 of a sub-assembly within the coupler housing.

This frame is riveted to a supporting bracket 63 affixed to the floor of the coupler housing.

Rotational movement of the bar 59 in either the forward or reverse direction will produce a corresponding rotation of the sun gear, whereby such rotation of the sun gear will add to or subtract from the normal gear ratio existing between the meter shaft and the counter shaft.

The bar 59 is provided with a key way 65. Slidably mounted on the bar is a wheel 67 having a pin 69 extending therethrough into the key way to preclude rotation of the wheel on the shaft, while still permitting slidable movement of the wheel along the bar.

Below the wheel is a drive disk 73 supported on a stem 77 which is journalled in a pair of aligned bearings 79, 81, one located in the floor of the subassembly frame and the other located at the point where the frame supporting bracket engages the floor of the housing.

On the disk stem is mounted a gear 83 which is coupled by a gear train 85 to the gear 47 in the gear train assembly, whereby the drive disk 73 is driven from the meter shaft.

The drive disk is urged into frictional drive engagement with the wheel by a compression spring 87 disposed between the lower bearing assembly 79 and the gear 83 mounted on the stem of the drive disk, and when so engaged, the plane of the drive disc is fixed against further upward movement of the disk by a flat headed screw 89 threaded into the bottom of the disk stem 77 until contact with the lower end of the proximate bearing 79 is established.

From the foregoing, it will be apparent that the drive disk will effect rotation of the wheel and bar, if the wheel happens to be off center with respect to the center of the disk, and that the ratio of rotation will be proportionate to the extent to which the wheel is off center with respect to the disk.

It will further be apparent that the direction of rotation of the wheel and bar will depend upon whether the wheel be to the right or to the left of the center of the disk.

Inasmuch as no rotation will occur when the wheel is in alignment with the center of the disk, the disk is preferably recessed at this point to avoid frictional contact with the wheel.

Thus the adjustable means for imparting varying degrees of rotation to the sun gear, and in either of its possible directions of rotation, permits of adjustment by shifting of the location of the wheel on the bar with respect to the center of the drive disk.

For shifting the wheel to obtain such adjustments, we provide a lever 93 having a forked end 95 straddling the wheel and supported at an intermediate point on a fulcrum 97. Structurally, the lever may be formed of a pair of metal strips 99 and 101 held in spaced relationship by suitable spacing rivets 103 and 105. By swinging the lever about its fulcrum, a corresponding shift of the wheel on the bar will result.

In accordance with the present invention, the adjustable means described above is placed under control of temperature responsive means 107 which is made responsive to variations of temperature of the liquid flowing through the meter, whereby the speed ratio between the meter shaft and the counter shaft may be correspondingly altered to provide an accurate reading on the counter, in terms of gallons or the like corrected to the reference temperature.

Such temperature responsive means includes a Sylphon bellows 111 within the housing and having one end anchored to a closure 113 in a wall opening of said housing, and connecting tube 115 connectible to a container (not shown) but which would be included in the meter in contact with the liquid flowing through the meter. When the bellows, tube and such container are filled with liquid having a high coefficient of expansion, any change in temperature thereof, as might be produced by variations in temperature of the liquid flowing through the meter in contact with such container, will cause a resulting expansion or contraction of the Sylphon bellows, thereby enabling said Sylphon bellows to sense changes in the temperature of liquid flowing through the meter.

This Sylphon bellows 111 is provided with a mechanical connection to the lever 93 at a point 118 thereon between the forked end thereof and the fulcrum, whereby to shift the location of the wheel with respect to the disk in response to such expansions or contractions of the Sylphon bellows. Such mechanical connection includes a sleeve 119 surrounding the Sylphon bellows and at least partially enclosing the free end of said bellows, and an aligned sleeve 121 having a partially enclosed end facing the partially enclosed end of the first sleeve 119, a compression spring 123 between the opposing ends of the respective sleeves, and an arm 125 connected to the opposite end of the second sleeve and extending between and beyond the spaced components 99 and 101 of the lever, and having pivotal connection with such components at the designated point 118.

At its extended end, the arm is enlarged eccentrically, such end being slidably received in an extension of the housing, for guidance and support, the extension of the housing being closed by a plug 127 which carries a guide pin 129 passing through a suitable perforation in the eccentric portion of the enlarged end to resist any tendency on the part of the Sylphon bellows or sleeves to twist or rotate.

Any other suitable mechanical connection between the Sylphon bellows 111 and the lever 93 may be utilized, but the particular mechanical connection illustrated and described as involving the second sleeve 121 and the intervening compression spring 123 has been selected since such elements constitute essential component parts of means for neutralizing expansion of the Sylphon bellows 111 attributable to changes in ambient atmospheric temperature. In the absence of such neutralizing means, a certain measure of error might creep into the readings due to expansion and contraction of the Sylphon bellows 111 attributable to changes in ambient atmospheric temperature.

Such neutralizing means as we have developed for the purpose, includes an outside sleeve 133 surrounding the sieeve 119 which houses the Sylphon bellows 111, to which sleeve the outside sleeve is affixed to preclude relative movement between the two and cause them to function as an integral unit. This outside sleeve slidably encloses the second sleeve 121 in which second sleeve, a comparable Sylphon bellows 135 is provided. This second Sylphon bellows is maintained in engagement with the spring contacted end of its sleeve by a pin 137 passing through a slot 139 in the second sleeve and fixed at its extremities in the wall of the outer sleeve, pressure being maintained against said pin by a lever 141 pivoted at one end to a boss 143 in the coupling housing and spring biased against such pin by a tension spring 145 hooked at one end over the lever and at its other end anchored to a suitably located boss 147 within the housing.

In the absence of any changes in ambient atmospheric temperature, an increase in temperature of liquid flowing through the meter will cause a corresponding expansion of the first Sylphon bellows 111 which in turn will carry its sleeve forward against the intermediate spring 123 and transmit its movement through such spring to the sleeve 121 of the second Sylphon bellows. This will cause the latter sleeve to move correspondingly and bring about a movement of the lever 93 of the adjustable means, to thereby cause a shift in the wheel and resulting rotation of the sun gear 37 to alter the speed ratio between the meter shaft and the counter shaft.

On the other hand, in response to any drop in temperature of the liquid flowing through the meter, the first Sylphon bellows 111 will contract, thereby permitting the spring biased lever 141 to drive the sleeve 121 of the second Sylphon bellows toward the first Sylphon bellows which in turn will cause the sleeve of the first Sylphon bellows to precede it. Such movement of the sleeve of the second Sylphon bellows will pull arm 125 along with it, thereby causing the lever of the adjustable means to be swung in the reverse direction.

In the course of such movements of the temperature responsive means attributable to change in temperature of liquid flowing through the meter, the outside sleeve 133 will move with the sleeve 119 of the first bellows, but will have no effect on adjustments being made. This is so, because in the absence of any changes in ambient atmospheric temperature, the sleeve 121 which houses the second Sylphon bellows will move along with the outside sleeve as if it were affixed to it.

However, assume a change in ambient atmospheric temperature in the direction of a rise in such temperature for example. The first Sylphon bellows 111 will expand in response to such rise in ambient temperature, and in doing so, will move both its sleeve 119 and the outside sleeve 133 along with it. Such movement of the outside sleeve will, of course, carry the pin 137 along with it against the spring biased lever 141, which would be in a direction away from the end of the second Sylphon bellows, thus allowing room for expansion of such bellows in that direction. Such expansion of the bellows in response to the same rise in ambient atmospheric temperature can then take place without forcing a corresponding movement of the sleeve 121 in which it is housed. Therefore, since there will be no movement of this sleeve, the lever of the adjustable means will not be affected and consequently no error will be introduced into the readings of the counter due to such rise in ambient temperature.

Should the ambient atmospheric temperature drop, the first Sylphon bellows 111 will contract and the spring biased lever 141 bearing against the 137 pin will then drive through the outside sleeve 133 to the sleeve of the first Sylphon bellows and cause it to move along with that Sylphon bellows as it contracts.

Were the movement of the pin resisted by the second Sylphon bellows, this bellows would be forced to move and carry with it the sleeve 121 in which it is housed. This would result in an adjustment of the adjustable means. But this does not occur, in that the second Sylphon bellows will contract along with the first one, and provide the necessary space between it and the pin to permit of movement of the pin without affecting any movement of the sleeve in which the second Sylphon bellows is housed. Thus, in the absence of movement of the sleeve 121, no adjustment takes place.

It becomes apparent therefore, that changes in ambient atmospheric temperature, whether up or down, will have no effect on the adjustable means and, consequently changes in such temperature cannot introduce any errors into the recordings of the counter.

As thus far described, the temperature compensator coupling means will accurately handle liquid of a particular viscosity or specific gravity. However, to adapt the apparatus to temperature compensate for liquids of differing specific gravities or viscosities, we find that it is only necessary to bring about a slight shift in the position of the fulcrum for the lever of the adjustable means.

With this in mind, the fulcrum 97 of the lever is in the form of a nut 155 having trunnions 157 extending through and adapted to slide within longitudinal notches 159 in the ends of the spaced components 99 and 101 forming the lever, thus enabling the location of the fulcrum to be shifted within relatively wide limits.

Manual adjustments of the fulcrum are provided for by a bolt 161 threaded into the nut and having a slotted head 163 rotatably housed in a bushing 165 located in a hollow cylindrical boss 167 on the wall of the housing, the bolt being maintained against longitudinal shift by means of a set screw 169 through the walls of the boss and bushing and extending into a peripheral groove 171 in the side wall of the bolt head.

A suitable scale 173 inscribed along one edge of a notch may be relied on to indicate adjustments of the fulcrum for liquids of different viscosities.

To prevent unauthorized tampering with an adjustment once it has been made, a disk 175 placed over the slotted head of the adjusting bolt, followed by a cotter pin 177 passing through holes in the boss and bushing provided therefor, will preclude access of a screw driver to the slotted head of the adjusting screw.

From the foregoing description of our invention in its preferred form, it will be apparent that the same is subject to alteration and modification without departing from the underlying principles involved and while we have illustrated and described the same in considerable detail, we do not desire to be limited in our protection to such details, except as may be necessitated by the appended claims.

We claim:

1. A temperature compensator coupling for coupling a liquid meter shaft and a counter shaft in a rotational speed relationship which will vary with temperature, comprising a housing; a drive connection in said housing, having one end connectable to such liquid meter shaft and the remaining end connectable to such counter shaft and including a continuous speed-ratio variable coupling; adjustable means for operating said continuous speed-ratio variable coupling within a limited speed range, said adjustable means comprising a bar having a drive connection with said continuous speed-ratio variable coupling, a rotatable drive disk in proximity to said bar, a wheel slidably mounted on said bar with its rim in the plane of the proximate surface of said drive disk, a lever having a forked end straddling said drive disk, and a fulcrum at an intermediate point along said lever; means responsive to temperature changes of the liquid flowing through such meter for effecting compensating adjustment in said adjustable means, said temperature responsive means including a Sylphon bellows in said housing, said Sylphon bellows having a temperature connection connectable to such liquid meter to enable said Sylphon bellows to sense the temperature of liquid flowing through such meter, and a mechanical connection from said Sylphon bellows to said lever at a point thereon between said forked end and said fulcrum whereby to change the location of said wheel with respect to said drive disk, said mechanical connection comprising a sleeve surrounding said Sylphon bellows and at least partially enclosing the free end of said bellows, an aligned sleeve having a partially enclosed end facing the partially enclosed end of said first sleeve and at its other end connected to said lever, and a coiled spring under compression between the opposing ends of said sleeves; and means for neutralizing expansion of said Sylphon bellows attributable to ambient temperature, said means including an outside sleeve affixed to said first sleeve and slidably enclosing said second sleeve, a Sylphon temperature responsive bellows in said second sleeve, a pin anchored in said outer sleeve and passing through a slot in said second sleeve between the Sylphon bellows therein and said lever, spring means urging said pin into pressure engagement with the proximate end of said Sylphon bellows.

2. A temperature compensator coupling for coupling a liquid meter shaft and a countershaft in a rotational speed relationship which will vary with temperature, comprising a housing; a drive connection in said housing, having one end connectable to such liquid meter shaft and the remaining end connectable to such countershaft and including a continuous speed-ratio variable coupling; adjustable means for operating said continuous speed-ratio variable coupling within a limited speed range, said adjustable means comprising a bar having a drive connection with said continuous speed ratio variable coupling, a rotatable drive disk in proximity to said bar, said disk being slightly recessed at its center, a wheel slidably mounted on said bar with its rim in the plane of the proximate surface of said drive disk, a lever having a forked end straddling said drive disk, and a fulcrum at an intermediate point along said lever; means responsive to temperature changes of liquid flowing through such meter for effecting compensating adjustments in said adjustable means, said temperature responsive means including a Sylphon bellows in said housing, said Sylphon bellows having a temperature connection connectable to such liquid meter to enable said Sylphon bellows to sense the temperature of liquid flowing through such meter, and a mechanical connection from said Sylphon bellows to said lever at a point thereon between said forked end and said fulcrum whereby to change the location of said wheel with respect to said driving disk, said mechanical connection comprising a sleeve surrounding said Sylphon bellows and at least partially enclosing the free end of said bellows, an aligned sleeve having a partially enclosed end facing the partially enclosed end of said first sleeve and at its other end connected to said lever, and a coiled spring under compression between the opposing ends of said sleeves; means for neutralizing expansion of said Sylphon bellows attributable to ambient temperature, said means including an outside sleeve affixed to said first sleeve and slidably enclosing said second sleeve, a Sylphon temperature responsive bellows in said second sleeve, a pin anchored in said outer sleeve and passing through a slot in said second sleeve between the Sylphon bellows therein and said lever, spring means urging said pin into pressure engagement with the proximate end of said Sylphon bellows; and means for shifting the location of said fulcrum to alter the rate of adjustability of said adjustable means to accurately compensate for liquids of different coefficients of expansion.

3. A temperature compensator coupling for coupling a liquid meter shaft and a countershaft in a rotational speed relationship which will vary with temperature, comprising a housing; a drive connection in said housing, having one end connectable to such liquid meter shaft and the remaining end connectable to such countershaft and including a continuous speed-ratio variable coupling, said continuous speed-ratio variable coupling comprising a planetary gear assembly including a sun gear; adjustable means for rotating said sun gear within a limited speed range, said adjustable means comprising a bar having a worm gear driving said sun gear, a rotatable drive disk in proximity to said bar, said disk being slightly recessed at its center, a wheel slidably mounted on said bar with its rim in the plane of the proximate surface of said drive disk, a lever having a forked end straddling said drive disk, and a fulcrum at an intermediate point along said lever; means adapted to respond to temperature changes of liquid flowing through such meter for effecting compensating adjustments in said adjustable means, said temperature responsive means including a Sylphon bellows in said housing, said Sylphon bellows having a temperature connection connectable to such liquid meter to enable said Sylphon bellows to sense the temperature of liquid flowing through such meter, and a mechanical connection from said Sylphon bellows to said lever at a point thereon between said forked end and said fulcrum whereby to change the location of said wheel with respect to said driving disk, said mechanical connection comprising a sleeve surrounding said Sylphon bellows and at least partially enclosing the free end of said bellows, an aligned sleeve having a partially enclosed end facing the partially enclosed end of said first sleeve and at its other end connected to said lever, and a coiled spring under compression between the opposing ends of said sleeves; means for neutralizing expansion of said Sylphon bellows attributable to ambient temperature, said means including an outside sleeve affixed to said first sleeve and slidably enclosing said second sleeve, a Sylphon temperature responsive bellows in said second sleeve, a pin anchored in said outer sleeve and passing through a slot in said second sleeve between the Sylphon bellows therein and said lever, spring means urging said pin into pressure engagement with the proximate end of said Sylphon bellows; and means for shifting the location of said fulcrum to alter the rate of adjustability of said adjustable means to accurately compensate for liquids of different coefficients of expansion.

References Cited in the file of this patent

UNITED STATES PATENTS

| | | |
|---|---|---|
| 1,881,572 | Herz | Oct. 11, 1932 |
| 2,208,687 | Renfrew | July 23, 1940 |
| 2,414,596 | Griffith et al. | Jan. 21, 1947 |
| 2,438,935 | Marsh | Apr. 6, 1948 |
| 2,791,118 | Holz | May 7, 1957 |
| 2,806,374 | Granberg | Sept. 17, 1957 |